US010168907B2

(12) United States Patent
Chang et al.

(10) Patent No.: US 10,168,907 B2
(45) Date of Patent: Jan. 1, 2019

(54) MEMORY SYSTEM AND OPERATING METHOD THEREOF

(71) Applicant: SK hynix Inc., Gyeonggi-do (KR)

(72) Inventors: Gi-Seob Chang, Gyeonggi-do (KR); Soong-Sun Shin, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 0 days.

(21) Appl. No.: 15/700,539

(22) Filed: Sep. 11, 2017

(65) Prior Publication Data
US 2018/0150225 A1 May 31, 2018

(30) Foreign Application Priority Data
Nov. 30, 2016 (KR) .................. 10-2016-0161934

(51) Int. Cl.
*G06F 3/06* (2006.01)
(52) U.S. Cl.
CPC ............ *G06F 3/0604* (2013.01); *G06F 3/064* (2013.01); *G06F 3/0679* (2013.01); *G06F 2212/7205* (2013.01)
(58) Field of Classification Search
None
See application file for complete search history.

(56) References Cited
U.S. PATENT DOCUMENTS

| 2012/0060012 A1* | 3/2012 | Olszewski | G06F 12/1009 711/171 |
| 2015/0186279 A1* | 7/2015 | Dong | G06F 12/0833 711/135 |
| 2016/0246730 A1* | 8/2016 | Gandhi | G06F 12/1009 |
| 2017/0199679 A1* | 7/2017 | Patocka | G06F 3/0613 |
| 2018/0109516 A1* | 4/2018 | Song | H04L 9/3263 |

FOREIGN PATENT DOCUMENTS

| KR | 100765786 | 10/2007 |
| KR | 1020120055563 | 5/2012 |
| KR | 1020130034450 | 4/2013 |
| KR | 1020130086449 | 8/2013 |
| KR | 1020150089538 | 8/2015 |

* cited by examiner

*Primary Examiner* — Tracy C. Chan
(74) *Attorney, Agent, or Firm* — IP & T Group LLP

(57) ABSTRACT a memory system may include: a memory device including a plurality of memory dies each having a plurality of memory blocks; and a controller suitable for performing one or more of data defragmentation and data remapping operations for a target transaction group in the memory device in response to a request message provided from a host, transmitting a completion message to the host as a response to the request message, and receiving an access to the transaction group, from the host.

14 Claims, 11 Drawing Sheets

MEMORY SYSTEM AND OPERATING METHOD THEREOF

CROSS-REFERENCE TO RELATED APPLICATION

This application claims priority under 35 U.S.C. § 119 to Korean Patent Application No. 10-2016-0161934 filed on Nov. 30, 2016 in the Korean Intellectual Property Office, the disclosure of which is herein incorporated by reference in its entirety.

TECHNICAL FIELD

Exemplary embodiments relate to a memory system, and more particularly, to a memory system for processing data to and from a memory device, and an operating method thereof.

DISCUSSION OF THE RELATED ART

The computer environment paradigm has changed to ubiquitous computing systems that can be used anytime and anywhere. Due to this, use of portable electronic devices such as mobile phones, digital cameras, and notebook computers has rapidly increased. These portable electronic devices generally use a memory system having one or more memory devices for storing data. A memory system may be used as a main or an auxiliary storage device of a portable electronic device.

Memory systems provide excellent stability, durability, high information access speed, and low power consumption because they have no moving parts. Examples of memory systems having such advantages include universal serial bus (USB) memory devices, memory cards having various interfaces, and solid state drives (SSD).

SUMMARY

Various embodiments are directed to a memory system capable of maximizing use efficiency in use of a memory device, and an operating method thereof.

In an embodiment, a memory system may include: a memory device including a plurality of memory dies each having a plurality of memory blocks; and a controller suitable for performing one or more of data defragmentation and data remapping operations for a target transaction group in the memory device in response to a request message provided from a host, transmitting a completion message to the host as a response to the request message, and receiving an access to the transaction group, from the host.

The request message may include a data array having information on data splits of the target transaction group, and address lists of the target transaction group.

The request message may further include a header having a flag indicating type information of the data defragmentation and data remapping operations.

The type information may indicate at last one among a general mode, a fast mode, an optimized mode, a cold mode and a hot mode.

The header may further have been a total size of the target transaction group.

The header may further have been a split count of the target transaction group.

The information on data splits of the target transaction group of the data array may have been start addresses and address sizes for respective data splits of the target transaction group.

The controller may identify a data distribution of the target transaction group in the memory device through the header, the data array and the address lists of the target transaction group.

The controller may perform the one or more of data defragmentation and data remapping operations for the data splits of the target transaction group with memory blocks of memory dies coupled to the same channel or memory blocks of the same cell type.

The controller may perform only a data remapping operation for metadata of the data splits of the target transaction group.

In an embodiment, a method for operating a memory system, may include: receiving, from a host, a request message with respect to a memory device including a plurality of memory dies each having a plurality of memory blocks; and performing one or more of data defragmentation and data remapping operations for a target transaction group in the memory device in response to the request message.

The request message may include a data array having information on data splits of the target transaction group, and address lists of the target transaction group.

The request message may further include a header having a flag indicating type information of the data defragmentation and data remapping operations.

The type Information may indicate at last one among a general mode, a fast mode, an optimized mode, a cold mode and a hot mode.

The header may further have been a total size of the target transaction group.

The header may further have been a split count of the target transaction group.

The information on data splits of the target transaction group of the data array have been start addresses and address sizes for respective data splits of the target transaction group.

The performing may include identifying a data distribution of the target transaction group in the memory device through the header, the data array and the address lists of the target transaction group.

The one or more of data defragmentation and data remapping operations may be performed for the data splits of the target transaction group with memory blocks of memory dies coupled to the same channel or memory blocks of the same cell type.

The data remapping operation may be performed for metadata of the data splits of the target transaction group.

BRIEF DESCRIPTION OF THE DRAWINGS

These and other features and advantages of the present invention will become apparent to those skilled in the art to which the present invention pertains from the following detailed description in reference to the accompanying drawings, wherein.

DETAILED DESCRIPTION

Figure 1:
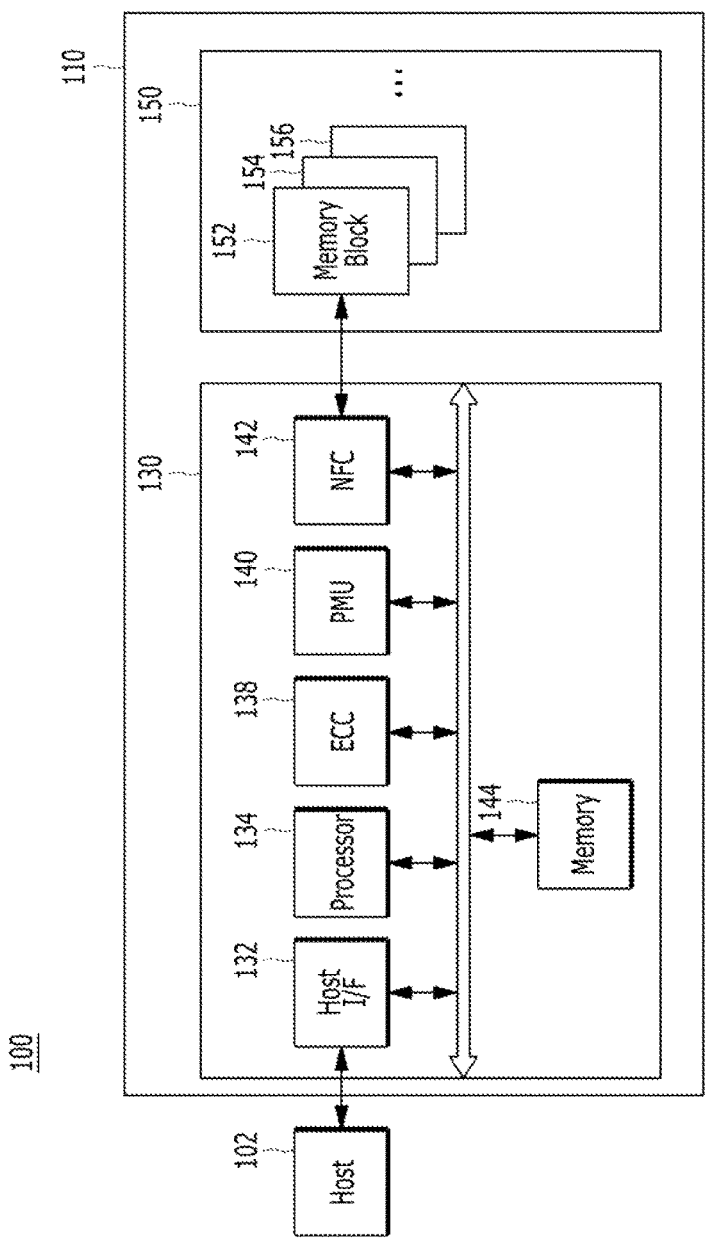
FIG. 1 is a block diagram illustrating a data processing system including a memory system in accordance with an embodiment of the present invention.

Various embodiments of the present invention are described below in more detail with reference to the accompanying drawings. We note, however, that the present invention may be embodied in different other embodiments, forms and variations thereof and should not be construed as being limited to the embodiments set forth herein. Rather, the described embodiments are provided so that this disclosure will be thorough and complete, and will fully convey the present invention to those skilled in the art to which this invention pertains. Throughout the disclosure, like reference numerals refer to like parts throughout the various figures and embodiments of the present invention.

It will be understood that, although the terms "first", "second", "third", and so on may be used herein to describe various elements, these elements are not limited by these terms. These terms are used to distinguish one element from another element. Thus, a first element described below could also be termed as a second or third element without departing from the spirit and scope of the present invention.

The drawings are not necessarily to scale and, in some instances, proportions may have been exaggerated in order to clearly illustrate features of the embodiments.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The terminology used herein is for the purpose of describing particular embodiments only and is not intended to be limiting of the present invention. As used herein, singular forms are intended to include the plural forms as well, unless the context clearly indicates otherwise. It will be further understood that the terms "comprises," "comprising," "Includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention belongs in view of the present disclosure. It will be further understood that terms, such as those defined in commonly used dictionaries, should be Interpreted as having a meaning that is consistent with their meaning in the context of the present disclosure and the relevant art and will not be interpreted in an idealized or overly formal sense unless expressly so defined herein.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some Instances, as would be apparent to those skilled in the relevant art, a feature or element described in connection with one embodiment may be used singly or in combination with other features or elements of another embodiment, unless otherwise specifically indicated.

FIG. 1 is a block diagram illustrating a data processing system 100 including a memory system 110 in accordance with an embodiment of the present invention.

Referring to FIG. 1, the data processing system 100 may include a host 102 and the memory system 110.

The host 102 may include portable electronic devices such as a mobile phone, MP3 player and laptop computer or non-portable electronic devices such as a desktop computer, game machine, TV and projector.

The memory system 110 may operate to store data for the host 102 in response to a request of the host 102. Non-limited examples of the memory system 110 may include a solid state drive (SSD), a multi-media card (MMC), a secure digital (SD) card, a universal storage bus (USB) device, a universal flash storage (UFS) device, compact flash (CF) card, a smart media card (SMC), a personal computer memory card international association (PCMCIA) card and memory stick. The MMC may include an embedded MMC (eMMC), reduced size MMC (RS-MMC) and micro-MMC. The SD card may include a mini-SD card and micro-SD card.

The memory system 110 may be embodied by various types of storage devices. Non-limited examples of storage devices included in the memory system 110 may include volatile memory devices such as a DRAM dynamic random access memory (DRAM) and a static RAM (SRAM) and nonvolatile memory devices such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), resistive RAM (RRAM) and a flash memory. The flash memory may have a 3-dimensional (3D) stack structure.

The memory system 110 may include a memory device 150 and a controller 130. The memory device 150 may store data for the host 120, and the controller 130 may control data storage into the memory device 150.

The controller 130 and the memory device 150 may be integrated into a single semiconductor device, which may be included in the various types of memory systems as exemplified above.

Non-limited application examples of the memory system 110 may include a computer, an Ultra Mobile PC (UMPC), a workstation, a net-book, a Personal Digital Assistant (PDA), a portable computer, a web tablet, a tablet computer, a wireless phone, a mobile phone, a smart phone, an e-book, a Portable Multimedia Player (PMP), a portable game machine, a navigation system, a black box, a digital camera, a Digital Multimedia Broadcasting (DMB) player, a 3-dimensional television, a smart television, a digital audio recorder, a digital audio player, a digital picture recorder, a digital picture player, a digital video recorder, a digital video player, a storage device constituting a data center, a device capable of transmitting/receiving information in a wireless environment, one of various electronic devices constituting a home network, one of various electronic devices constituting a computer network, one of various electronic devices constituting a telematics network, a Radio Frequency Identification (RFID) device, or one of various components constituting a computing system.

The memory device 150 may be a nonvolatile memory device and may retain data stored therein even though power is not supplied. The memory device 150 may store data provided from the host 102 through a write operation, and provide data stored therein to the host 102 through a read operation. The memory device 150 may include a plurality of memory dies (not shown), each memory die including a plurality of planes (not shown), each plane including a plurality of memory blocks 152 to 156, each of the memory blocks 152 to 156 may include a plurality of pages, and each of the pages may include a plurality of memory cells coupled to a word line.

The controller 130 may control the memory device 150 in response to a request from the host 102. For example, the controller 130 may provide data read from the memory device 150 to the host 102, and store data provided from the host 102 into the memory device 150. For this operation, the controller 130 may control read, write, program and erase operations of the memory device 150.

The controller 130 may include a host interface (I/F) unit 132, a processor 134, an error correction code (ECC) unit 138, a Power Management Unit (PMU) 140, a NAND flash controller (NFC) 142 and a memory 144 all operatively coupled via an internal bus.

The host interface unit 132 may be configured to process a command and data of the host 102, and may communicate with the host 102 through one or more of various interface protocols such as universal serial bus (USB), multi-media card (MMC), peripheral component interconnect-express (PCI-E), small computer system Interface (SCSI), serial-attached SCSI (SAS), serial advanced technology attachment (SATA), parallel advanced technology attachment (PATA), enhanced small disk interface (ESDI) and Integrated drive electronics (IDE).

The ECC unit 138 may detect and correct an error contained in the data read from the memory device 150. In other words, the ECC unit 138 may perform an error correction decoding process to the data read from the memory device 150 through an ECC code used during an ECC encoding process. According to a result of the error correction decoding process, the ECC unit 138 may output a signal, for example, an error correction success/fail signal. When the number of error bits is more than a threshold value of correctable error bits, the ECC unit 138 may not correct the error bits, and may output an error correction fail signal.

The ECC unit 138 may perform error correction through a coded modulation such as Low Density Parity Check (LDPC) code, Bose-Chaudhri-Hocquenghem (BCH) code, turbo code, Reed-Solomon code, convolution code, Recursive Systematic Code (RSC), Trellis-Coded Modulation (TCM) and Block coded modulation (BCM). However, the ECC unit 138 is not limited thereto. The ECC unit 138 may include all circuits, modules, systems or devices for error correction.

The PMU 140 may provide and manage power of the controller 130.

The NFC 142 may serve as a memory/storage interface for interfacing the controller 130 and the memory device 150 such that the controller 130 controls the memory device 150 in response to a request from the host 102. When the memory device 150 is a flash memory or specifically a NAND flash memory, the NFC 142 may generate a control signal for the memory device 150 and process data to be provided to the memory device 150 under the control of the processor 134. The NFC 142 may work as an interface (e.g., a NAND flash interface) for processing a command and data between the controller 130 and the memory device 150. Specifically, the NFC 142 may support data transfer between the controller 130 and the memory device 150.

The memory 144 may serve as a working memory of the memory system 110 and the controller 130, and store data for driving the memory system 110 and the controller 130. The controller 130 may control the memory device 150 to perform read, write, program and erase operations in response to a request from the host 102. The controller 130 may provide data read from the memory device 150 to the host 102, may store data provided from the host 102 into the memory device 150. The memory 144 may store data required for the controller 130 and the memory device 150 to perform these operations.

The memory 144 may be embodied by a volatile memory. For example, the memory 144 may be embodied by static random access memory (SRAM) or dynamic random access memory (DRAM). The memory 144 may be disposed within or out of the controller 130. FIG. 1 exemplifies the memory 144 disposed within the controller 130. In an embodiment, the memory 144 may be embodied by an external volatile memory having a memory interface transferring data between the memory 144 and the controller 130.

The processor 134 may control the overall operations of the memory system 110. The processor 134 may drive firmware to control the overall operations of the memory system 110. The firmware may be referred to as flash translation layer (FTL).

The processor 134 of the controller 130 may include a management unit (not illustrated) for performing a bad management operation of the memory device 150. The management unit may perform a bad block management operation of checking a bad block, in which a program fail occurs due to the characteristic of a NAND flash memory during a program operation, among the plurality of memory blocks 152 to 156 included in the memory device 150. The management unit may write the program-failed data of the bad block to a new memory block. In the memory device 150 having a 3D stack structure, the bad block management operation may reduce the use efficiency of the memory device 150 and the reliability of the memory system 110. Thus, the bad block management operation needs to be performed with more reliability.

Figure 2:
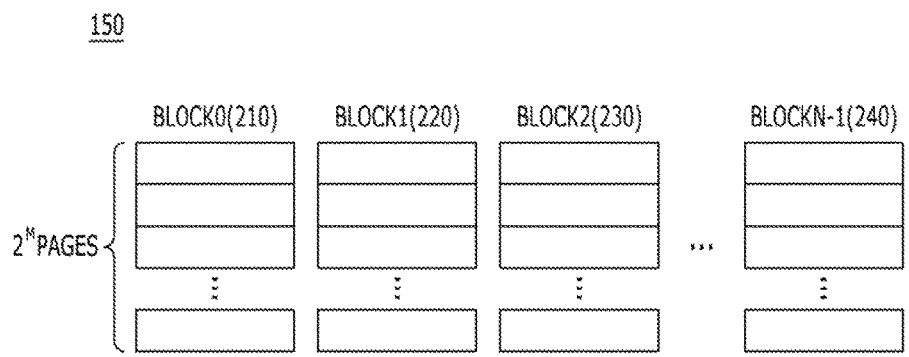
FIG. 2 is a schematic diagram illustrating an exemplary configuration of a memory device employed in the memory system shown in FIG. 1.

FIG. 2 is a schematic diagram illustrating the memory device 150.

Referring to FIG. 2, the memory device 150 may include a plurality of memory blocks 0 to N−1, and each of the blocks 0 to N−1 may include a plurality of pages, for example, $2^M$ pages, the number of which may vary according to circuit design. Memory cells included in the respective memory blocks 0 to N−1 may be one or more of a single level cell (SLC) storing 1-bit data, or a multi-level cell (MLC) storing 2- or more bit data. In an embodiment, the memory device 150 may include a plurality of triple level cells (TLC) each storing 3-bit data. In another embodiment, the memory device may include a plurality of quadruple level cells (QLC) each storing 4-bit level cell.

Figure 3:
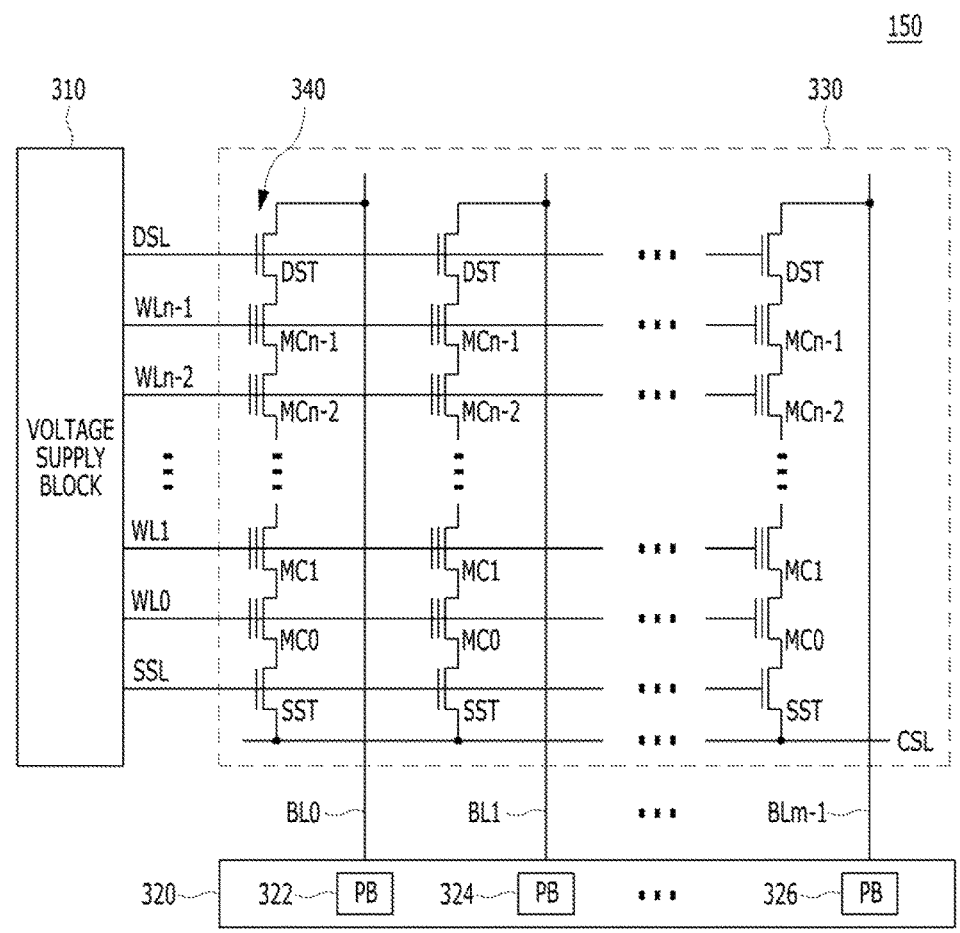
FIG. 3 is a circuit diagram Illustrating an exemplary configuration of a memory cell array of a memory block in the memory device shown in FIG. 2.

FIG. 3 is a circuit diagram Illustrating an exemplary configuration of a memory cell array of a memory block in the memory device 150.

Referring to FIG. 3, a memory block 330 which may correspond to any of the plurality of memory blocks 152 to 156 included in the memory device 150 of the memory system 110 may include a plurality of cell strings 340 coupled to a plurality of corresponding bit lines BL0 to BLm−1. The cell string 340 of each column may include one or more drain select transistors DST and one or more source select transistors SST. Between the drain and source select transistors DST and SST, a plurality of memory cells MC0 to MCn−1 may be coupled in series. In an embodiment, each of the memory cell transistors MC0 to MCn−1 may be embodied by an MLC capable of storing data information of a plurality of bits. Each of the cell strings 340 may be electrically coupled to a corresponding bit line among the plurality of bit lines BL0 to BLm−1. For example, as Illustrated in FIG. 3, the first cell string is coupled to the first bit line BL0, and the last cell string is coupled to the last bit line BLm−1.

Although FIG. 3 illustrates NAND flash memory cells, the invention is not limited in this way. It is noted that the memory cells may be NOR flash memory cells, or hybrid flash memory cells including two or more kinds of memory cells combined therein. Also, it is noted that the memory device 150 may be a flash memory device including a conductive floating gate as a charge storage layer or a charge trap flash (CTF) memory device including an insulation layer as a charge storage layer.

The memory device 150 may further include a voltage supply unit 310 which provides word line voltages including a program voltage, a read voltage and a pass voltage to supply to the word lines according to an operation mode. The voltage generation operation of the voltage supply unit 310 may be controlled by a control circuit (not Illustrated). Under the control of the control circuit, the voltage supply unit 310 may select one of the memory blocks (or sectors) of the memory cell array, select one of the word lines of the selected memory block, and provide the word line voltages to the selected word line and the unselected word lines as may be needed.

The memory device 150 may include a read/write circuit 320 which is controlled by the control circuit. During a verification/normal read operation, the read/write circuit 320 may operate as a sense amplifier for reading data from the memory cell array. During a program operation, the read/write circuit 320 may operate as a write driver for driving bit lines according to data to be stored in the memory cell array. During a program operation, the read/write circuit 320 may receive from a buffer (not illustrated) data to be stored into the memory cell array, and drive bit lines according to the received data. The read/write circuit 320 may include a plurality of page buffers 322 to 326 respectively corresponding to columns (or bit lines) or column pairs (or bit line pairs), and each of the page buffers 322 to 326 may include a plurality of latches (not illustrated).

Figure 4:
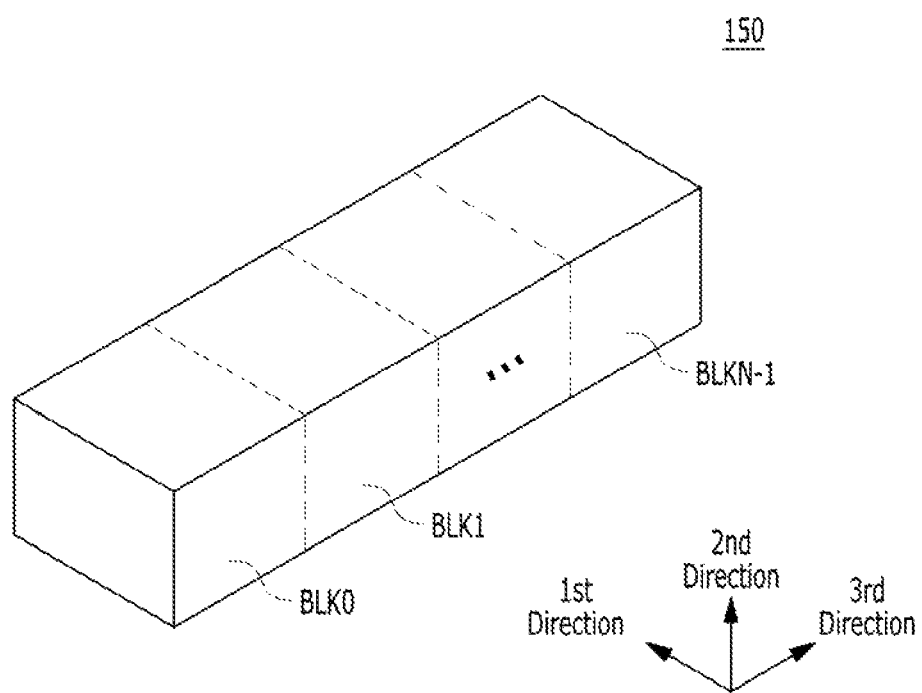
FIG. 4 is a schematic diagram illustrating an exemplary three-dimensional structure of the memory device shown in FIG. 2.

FIG. 4 is a schematic diagram illustrating an exemplary 3D structure of the memory device 150.

The memory device 150 may be embodied by a 2D or 3D memory device. Specifically, as illustrated in FIG. 4, the memory device 150 may be embodied by a nonvolatile memory device having a 3D stack structure. When the memory device 150 has a 3D structure, the memory device 150 may include a plurality of memory blocks BLK0 to BLKN−1 each having a 3D structure (or vertical structure).

Hereinbelow, detailed descriptions will be made with reference to FIGS. 5 to 8, for data processing with respect to the memory device 150 in a memory system in accordance with an embodiment, particularly, a data processing operation in the case of performing a command operation corresponding to a command received from the host 102 and a data management operation.

FIGS. 5 to 8 are schematic diagrams illustrating a data processing operation with respect to a memory device in a memory system in accordance with an embodiment of the present invention. In the embodiment of the present disclosure, for the sake of convenience in explanation, detailed descriptions will be made, as an example, for data processing in the case of performing a command operation corresponding to a command received from the host 102 in the memory system 110 shown in FIG. 1, for example, performing a program operation corresponding to a write command received from the host 102 or performing a read operation corresponding to a read command received from the host 102 and managing the data stored in the memory device 150 in correspondence to the program operation and the read operation.

Hereinbelow, in the embodiment of the present disclosure, descriptions will be made, as an example, for data processing in the case where, after storing write data corresponding to the write command received from the host 102, in the buffer/cache included in the memory 144 of the controller 130, the data stored in the buffer/cache are written and stored, that is, programmed, in a plurality of memory blocks included in the memory device 150, and the data stored in the memory device 150 are managed in correspondence to the program operation with respect to the memory device 150. Further, in the embodiment of the present disclosure, descriptions will be made, as an example, for data processing in the case where, when a read command is received from the host 102 for the data stored in the memory device 150, data corresponding to the read command are read from the memory device 150 by checking the map data of the data corresponding to the read command, and, after storing the read data in the buffer/cache included in the memory 144 of the controller 130, the data stored in the buffer/cache are provided to the host 102 and the data stored in the memory device 150 are managed in correspondence to the read operation in the memory device 150.

Further, while, in the present embodiment, it will be described below as an example for the sake of convenience in explanation that the controller 130 performs a data processing operation in the memory system 110, it is to be noted that, as described above, the processor 134 included in the controller 130 may perform a data processing operation through, for example, an FTL (flash translation layer). For example, in the embodiment of the present disclosure, after storing user data and metadata corresponding to the write command received from the host 102, in the buffer included in the memory 144 of the controller 130, the controller 130 write and stores the data stored in the buffer, in optional memory blocks among the plurality of memory blocks included in the memory device 150, that is, performs a program operation.

The metadata may include first map data including a logical/physical (L2P: logical to physical) information (hereinafter, referred to as a 'logical Information') and second map data including a physical/logical (P2L: physical to logical) information (hereinafter, referred to as a 'physical information'), for the data stored in the memory blocks in correspondence to the program operation. Also, the metadata may include an Information on the command data corresponding to the command received from the host 102, an information on the command operation corresponding to the command, an information on the memory blocks of the memory device 150 for which the command operation is to be performed, and an information on map data corresponding to the command operation. In other words, the metadata may include all remaining information and data excluding the user data corresponding to the command received from the host 102.

That is to say, in the embodiment of the present disclosure, the controller 130 performs a command operation corresponding to a command received from the host, that is, performs a program operation corresponding to a write command, for example, in the case where the write command is received from the host 102. At this time, the user data corresponding to the write command are written and stored in the memory blocks of the memory device 150, for example, empty memory blocks, open memory blocks or free memory blocks for which an erase operation is performed, among the memory blocks; and first map data including an L2P map table or an L2P map list in which mapping information between logical addresses and physical addresses for the user data stored in the memory blocks, that is, logical information, are recorded and second map data including a P2L map table or a P2L map list in which mapping information between physical addresses and logical addresses for the memory blocks in which the user data are stored, that is, physical information, are recorded are written and stored in the empty memory blocks, open memory blocks or the free memory blocks among the memory blocks of the memory device 150.

Here, when receiving a write command from the host 102, the controller 103 writes and stores user data corresponding to the write command in memory blocks, and stores metadata including first map data and second map data for the user data stored in the memory blocks, in memory blocks. In particular, in correspondence to that the data segments of the user data are stored in the memory blocks of the memory device 150, the controller 130 generates and updates the meta segments of the metadata, that is, the L2P segments of the first map data and the P2L segments of the second map data as the map segments of the map data, and stores the map segments in the memory blocks of the memory device 150. At this time, the controller 130 updates the map segments stored in the memory blocks of the memory device 150, by loading them in the memory 144 of the controller 130.

Further, when receiving a read command from the host 102, the controller 130 reads read data corresponding to the read command received from the host 102, from the memory device 150, stores the read data in the buffer/cache included in the memory 144 of the controller 130, and then, provides the data stored in the buffer/cache, to the host 102, by which a read operation corresponding to the read command is performed. Hereinbelow, a data processing operation in the memory system in accordance with the embodiment will be described in detail with reference to FIGS. 5 to 8.

Figure 5:
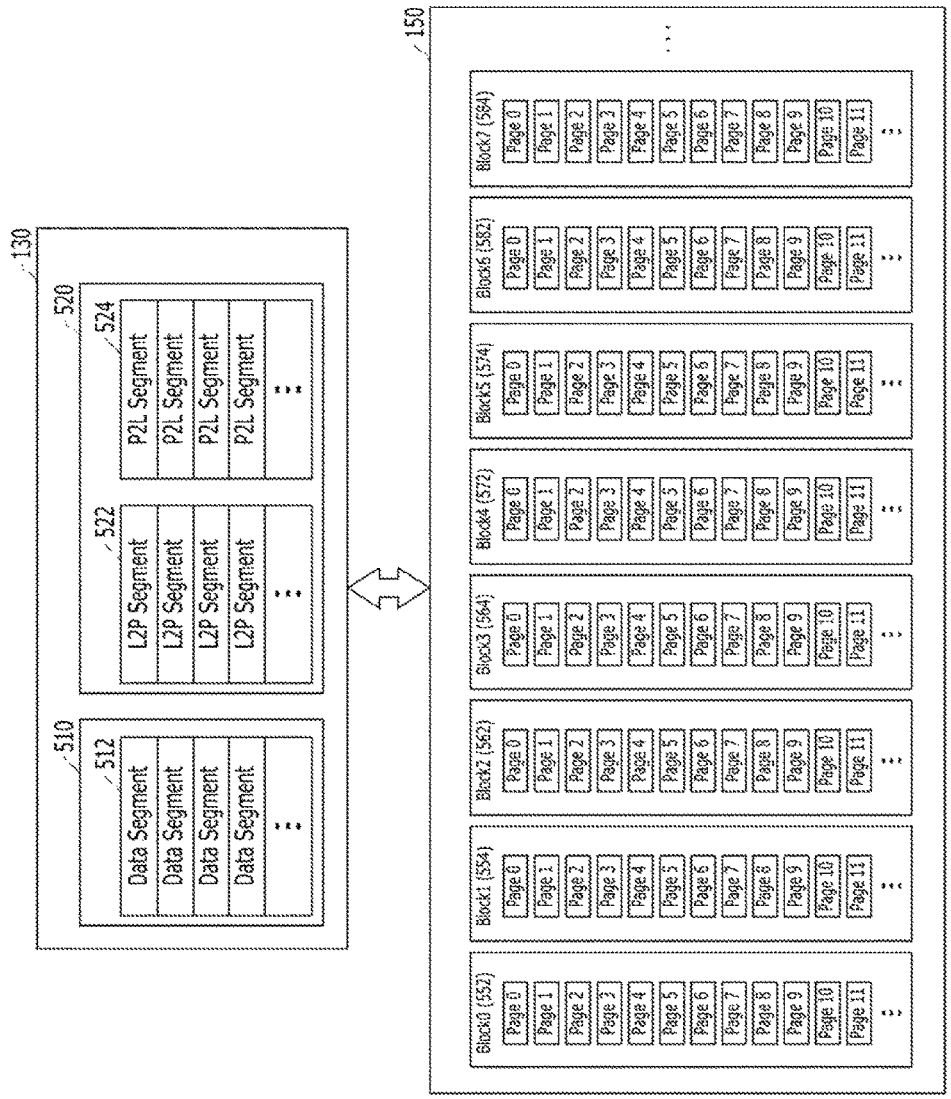
FIGS. 5 to 8 are schematic diagrams illustrating a data processing operation to a memory device shown in FIGS. 1 to 4.

Referring to FIG. 5, the controller 130 performs a command operation corresponding to a command received from the host 102, for example, a program operation corresponding to a write command received from the host 102. At this time, the controller 130 writes and stores user data corresponding to the write command, in memory blocks 552 to 584 of the memory device 150. Also, in correspondence to the write operation to the memory blocks 552 to 584, the controller 130 generates and updates metadata for the user data and writes and stores the metadata in the memory blocks 552 to 584 of the memory device 150.

The controller 130 generates and updates information indicating that the user data are stored in the pages included in the memory blocks 552 to 584 of the memory device 150, for example, first map data and second map data, that is, generates and updates the logical segments of the logical-to-physical (L2P) map data, that is, L2P segments, and the physical segments of the physical-to-logical (P2L) map data, that is, P2L segments, and then, stores the L2P segments and the P2L segments in the memory blocks 552 to 584 of the memory device 150.

For example, the controller 130 may cache and buffer the user data corresponding to the write command received from the host 102, in a first buffer 510 included in the memory 144 of the controller 130, that is, may store data segments 512 of the user data in the first buffer 510 as a data buffer/cache. Then, the controller 130 may write and store the data segments 512 stored in the first buffer 510, in the pages included in the memory blocks 552 to 584 of the memory device 150.

As the data segments 512 of the user data corresponding to the write command received from the host 102 are written and stored in the pages included in the memory blocks 552 to 584 of the memory device 150, the controller 130 may generate and update the L2P map data and the P2L map data, and may store the L2P and the P2L map data in a second buffer 520 included in the memory 144 of the controller 130. Namely, the controller 130 stores L2P segments 522 of the L2P map data for the user data and P2L segments 524 of the P2L map data for the user data, in the second buffer 520 as a map buffer/cache. In the second buffer 520 in the memory 144 of the controller 130, there may be stored, as described above, the L2P segments 522 of the first map data and the P2L segments 524 of the second map data, or there may be stored a map list for the L2P segments 522 of the first map data and a map list for the P2L segments 524 of the second map data. The controller 130 may write and store the L2P segments 522 of the L2P map data and the P2L segments 524 of the P2L map data which are stored in the second buffer 520, in the pages included in the memory blocks 552 to 584 of the memory device 150.

Also, the controller 130 may perform a command operation corresponding to a command received from the host 102, for example, a read operation corresponding to a read command received from the host 102. At this time, the controller 130 may load the map segments of user data corresponding to the read command, for example, L2P segments 522 of L2P map data and P2L segments 524 of P2L map data, in the second buffer 520, and may check the L2P segments 522 and the P2L segments 524. After that, the controller 130 may read the user data stored in the pages included in corresponding memory blocks among the memory blocks 552 to 584 of the memory device 150, store data segments 512 of the read user data in the first buffer 510, and provide the data segments 512 to the host 102.

Figure 6:
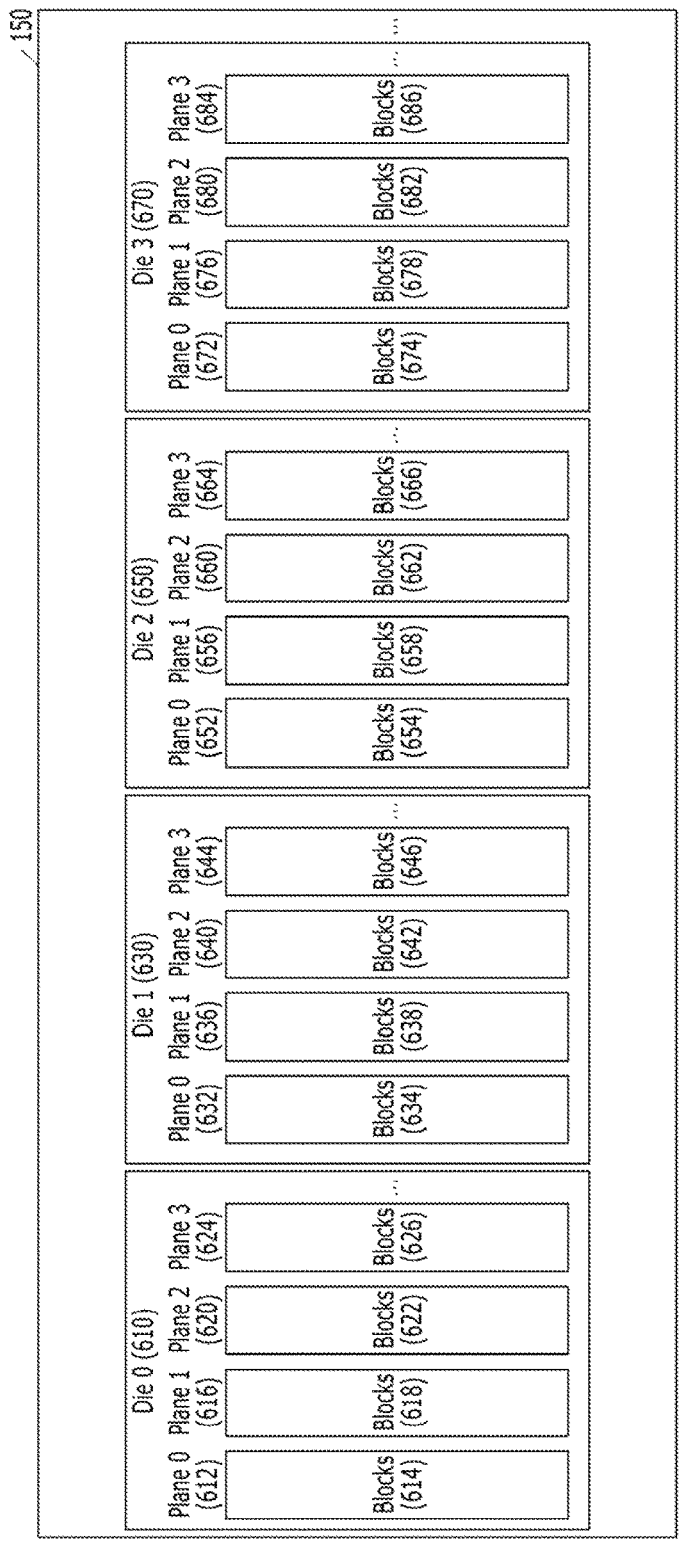

Referring to FIG. 6, the memory device 150 includes a plurality of memory dies, for example, a memory die 0 610, a memory die 1 630, a memory die 2 650 and a memory die 3 670. Each of the memory dies 610 to 670 includes a plurality of planes. For example, the memory die 0 610 includes a plane 0 612, a plane 1 616, a plane 2 620 and a plane 3 624, the memory die 1 630 includes a plane 0 632, a plane 1 636, a plane 2 640 and a plane 3 644, the memory die 2 650 includes a plane 0 652, a plane 1 656, a plane 2 660 and a plane 3 664, and the memory die 3 670 includes a plane 0 672, a plane 1 676, a plane 2 680 and a plane 3 684. The respective planes 612 to 684 in the memory dies 610 to 670 included in the memory device 150 include a plurality of memory blocks 614 to 686.

In the memory system in accordance with the embodiment, in the case where a write command is received from the host 102 for user data stored in first pages of first memory blocks, the controller 130 stores the user data corresponding to the write command in first pages of second memory blocks. At this time, the user data stored in the first pages of the first memory blocks, become invalid data, and accordingly, the first pages of the first memory blocks become invalid pages.

Also, in the memory system in accordance with the embodiment, as a program operation corresponding to a write command received from the host 102 is performed, invalid pages are included in the memory blocks of the memory device 150, and because of the invalid pages in the memory blocks of the memory device 150, data fragmentation and data split may occur in the memory device 150. Therefore, in a command operation corresponding to a command received from the host 102, in particular, in a read operation corresponding to a read command, since data access to data corresponding to the read command in the memory device 150 may be implemented inefficiently. Due to the data fragmentation and data split, data corresponding to the same transaction group, the same task group or the same file group may be randomly stored as distributed in the memory device 150. Accordingly, data access efficiency to the data stored in the memory device 150 may be degraded markedly.

Therefore, a management operation such as data defragmentation and data remapping operations are performed in the memory device 150 in order to recover the memory device 150 from the data fragmentation and data split.

In particular, in an embodiment, in the case where the controller 130 repeatedly performs a program operation corresponding to a write command received from the host 102, a program operation for the data stored in the memory device 150, that is, a program update operation, and an erase operation for the memory device 150 in order for the program operation and the program update operation, data fragmentation and data split may occur in the memory device 150 as invalid pages are included in the memory device 150, as described above. Furthermore, by the data fragmentation and data split, data corresponding to the same transaction group, the same task group or the same file group may be stored by being randomly distributed in the memory device 150, and accordingly, data access efficiency to the data stored in the memory device 150 may be degraded markedly. Therefore, a management operation, that is, data defragmentation and data remapping operations are performed for the data stored in the memory device 150. Hereinbelow, in the memory system in accordance with an embodiment, data management operations, that is, data defragmentation and data remapping operations, for the data stored in the memory device 150, to maximize data access efficiency to the memory device 150, will be described in detail with reference to FIGS. 7 and 8.

Figure 7:
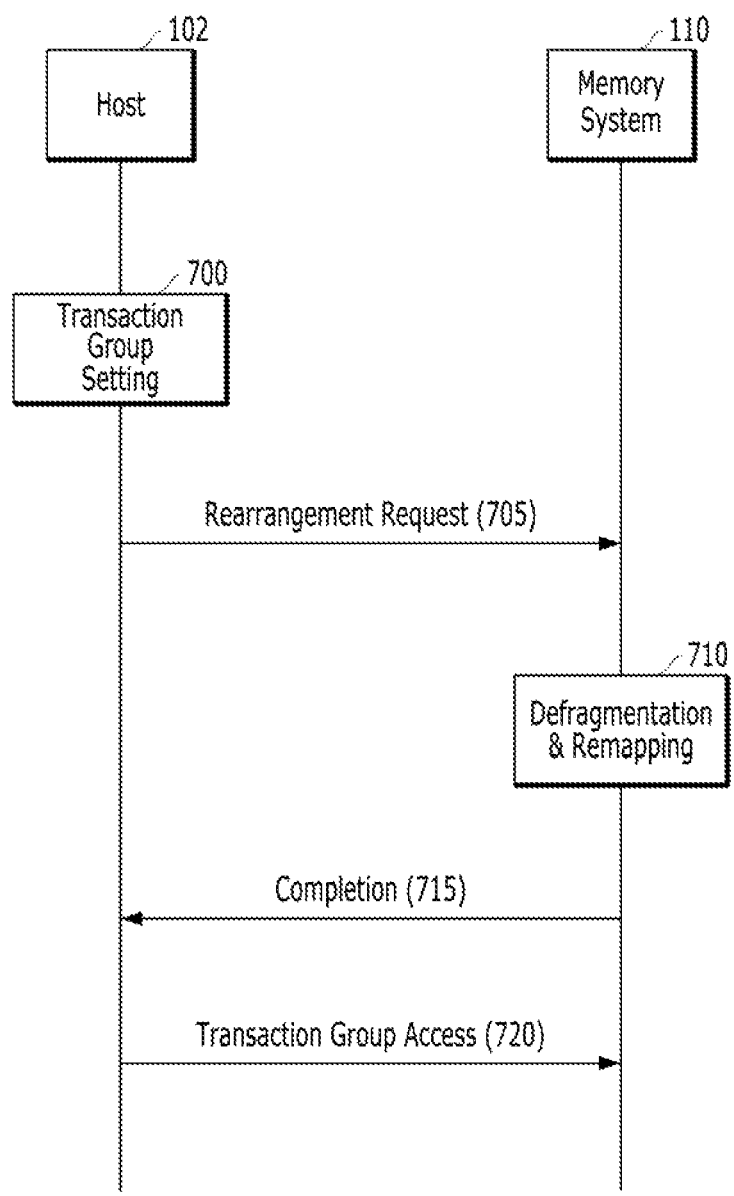

Referring to FIG. 7, in the case where, as described above, a command operation corresponding to a command received from the host 102 is performed, in particular, a program operation corresponding to a write command received from the host 102, a program operation for the data stored in the memory device 150, that is, a program update operation, and an erase operation for the memory device 150 in order for the program operation and the program update operation are repeatedly performed, in order to minimize degradation of data access efficiency due to data fragmentation and data split in the memory device 150, the memory system 110 performs a data management operation for the data stored in the memory device 150, for example, data defragmentation and data remapping operations in the memory device 150.

When data corresponding to the same transaction group, the same task group or the same file group is randomly stored as distributed in the memory device 150, the host 102 sets a transaction group, a task group or a file group (hereinafter, collectively referred to as a target transaction group) for corresponding data at step 700.

After step 700, the host 102 transmits a rearrangement request message corresponding to the target transaction group, to a file system (not illustrated) of the host 102, and the file system of the host 102 transmits a rearrangement request message including address lists, for example, logical block address (LBA) lists of the target transaction group, to the memory system 110 at step 705. The memory system 110 receives from the host 102 the rearrangement request message that requests data defragmentation and data remapping operations to the memory device 150).

Hence, the rearrangement request message is transmitted to the memory system 110 by the host 102, to improve data access efficiency to the data stored in the memory device 150. In this regard, as described above, since data corresponding to the same transaction group, the same task group or the same file group may be stored by being randomly distributed in the memory device 150, the host 102 sets a transaction group, a task group or a file group, for example, a transaction group, for corresponding data (700). After setting a transaction group which is accessible in an application of the host 102, the host 102 transmits a rearrangement request message corresponding to the transaction group, to a file system of the host 102, and the file system of the host 102 transmits a rearrangement request message including address lists, for example, LBA (logical block address) lists, of the transaction group, to the memory system 110.

After confirming the rearrangement request message received from the host 102 by the controller 130, the memory system 110 performs a management operation for the data stored in the memory device 150, that is, performs data defragmentation and data remapping operations in the memory device 150 (710). A rearrangement manager may be included in the controller 130. Through the rearrangement manager, the controller 130 confirms the rearrangement request message received from the host 102 and then performs data defragmentation and data remapping operations according to information included in the rearrangement request message. In particular, the controller 130 performs data defragmentation and data remapping operations, for the data of the transaction group included in the rearrangement request message.

When making detailed descriptions by taking an example, the memory system 110 confirms the rearrangement request message received from the host 102, in particular, confirms the data distribution of the transaction group in the memory device 150, through the address lists of the transaction group included in the rearrangement request message. The rearrangement request message includes a header and a data array as shown in FIG. 8.

Figure 8:
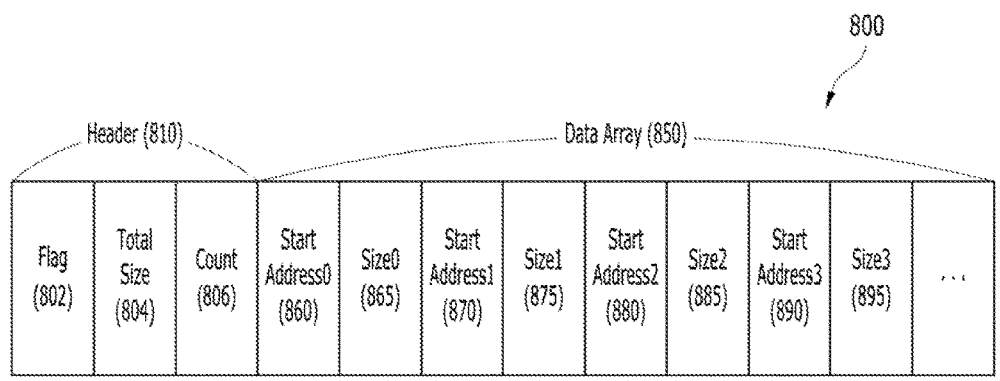

FIG. 8 shows the rearrangement request message 800 including a header 810 and a data array 850.

In the header 810 of the rearrangement request message 800, there are included basic information on data defragmentation and data remapping operations to the target transaction group, in the case where the controller 130 performs data defragmentation and data remapping operations in the memory device 150 for the transaction group, through the rearrangement manager. In the header 810, there are included a flag 802 in which a type information of data defragmentation and data remapping operations to the target transaction group is included, a total size 804 of the target transaction group, and a count 806 of the target transaction group.

In the flag 802 of the header 810, there may be included an information which instructs performing of data defragmentation and data remapping operations in a general mode, an information which instructs performing of data defragmentation and data remapping operations in a fast mode, an information which instructs performing of data defragmentation and data remapping operations in an optimized mode, an information which instructs performing of data defragmentation and data remapping operations in a cold mode, and an information which instructs performing of data defragmentation and data remapping operations in a hot mode.

In the general mode, general data defragmentation and data remapping operations are performed to metadata and user data of the target transaction group.

In the fast mode, in which the host 102 requests a quick response of the remapping operation, only a data remapping operation is performed to the metadata of the transaction group. Accordingly, since copying and moving of the user data is not performed and thus program and erase operations are not performed in the fast mode, a program/erase (P/E) cycle in the memory device 150 is not changed.

In the optimized mode, data defragmentation and data remapping operations are performed to the target transaction group according to a system cycle (for example, a cycle of the memory system 110 or a cycle of the data processing system 100), or according to a workload of the target transaction group.

The cold mode and the hot mode are set by the file system of the host 102 according to a record of access to the data of the target transaction group (for example, read or write history of the data of the target transaction group).

In the cold mode, data defragmentation and data remapping operations are performed to the target transaction group in consideration of a wear leveling operation to the memory device 150. For example, data defragmentation and data remapping operations are performed to an MLC memory block region, a TLC memory block region or a QLC memory block region in the memory device 150 for the metadata and user data of the target transaction group. The metadata and user data of the target transaction group to which data defragmentation and data remapping operations are performed in the cold mode may become cold data.

In the hot mode, data defragmentation and data remapping operations are performed to the target transaction group in consideration of interleaving for the data of the target transaction group. For example, data defragmentation and data remapping operations for the metadata and user data of the target transaction group are performed to an SLC memory block region in the memory device 150. When a read or write operation is frequently performed for the metadata and user data of the target transaction group, in order to ensure that the metadata and user data of the target transaction group are stored and retained in an SLC memory block region, the user data of the target transaction group currently stored in the SLC memory block region are not moved or copied and only a remapping operation is performed for the metadata of the target transaction group in the hot mode. The metadata and user data of the target transaction group for which data defragmentation and data remapping operations are performed in the hot mode may be hot data.

In the total size 804 of the header 810, there is included an information on the total size of the target transaction group to which data defragmentation and data remapping operations are to be performed.

In the count 806 of the header 810, there is included a split count that Indicates a number of data splits of the target transaction group since the data of the target transaction group are randomly stored as distributed over the memory device 150.

In the data array 850 of the rearrangement request message 800, there is included information on the data splits of the target transaction group. In other words, in the data array 850, there is included location information on the data splits of the target transaction group that is indicated by the count 806 of the header 810. In the data array 850, there is included location information which indicate start addresses and address sizes of the LBAs for the respective data splits in correspondence to the LBA lists of the target transaction group.

As exemplified in FIG. 8, in the data array 850, there are included start addresses 0 to 3 (represented by reference numerals 860, 870, 880 and 890 of the figure) and address sizes 0 to 3 (represented by reference numerals 865, 875, 885 and 895 of the figure) of the LBAs for respective data splits 0 to 3 of the transaction group.

After step 705, the memory system 110 performs data defragmentation and data remapping operations to the memory device 150 at step 710. A rearrangement manager (not illustrated) may be included in the controller 130. Through the rearrangement manager, the controller 130 performs data defragmentation and data remapping operations according to information included in the rearrangement request message. In particular, the controller 130 performs data defragmentation and data remapping operations for the data of the target transaction group.

At step 710, the memory system 110 identifies data distribution of the target transaction group in the memory device 150 through the LBA lists of the target transaction group included in the rearrangement request message. The memory system 110 identifies data distribution of the target transaction group through the header 810 and the data array 850 included in the rearrangement request message 800, and performs data defragmentation and data remapping operations for the target transaction group. The controller 130 identifies the locations of the respective data splits of the target transaction group in the memory device 150 through the header 810 and the data array 850 included in the rearrangement request message 800. Then, the controller 130 performs data defragmentation and data remapping operations, for the respective data splits of the target transaction group.

For example, the controller 130 performs data defragmentation and data remapping operations for the respective data splits of the target transaction group with memory blocks included in different memory planes of different memory dies coupled to the same channel or the same memory die. The data defragmentation and data remapping operations are performed with the different memory planes of different memory dies coupled to the same channel or the same memory die in consideration of interleaving (for example, channel interleaving, memory die interleaving or way interleaving) in access to the respective data splits of the target transaction group. For example, the controller 130 performs data defragmentation and data remapping operations for the data splits 0 to 3 of the target transaction group randomly stored in the memory blocks of the memory dies 610 to 670 with the memory blocks of the memory dies 0 and 2 (610 and 650) coupled to the same channel.

Also, the controller 130 performs data defragmentation and data remapping operations for the respective data splits of the target transaction group in consideration of types of respective memory blocks (e.g., SLC, MLC, TLC and QLC memory blocks) in the memory device 150. For example, in the hot mode indicated by the flag 802 of the header 810, the controller 130 performs data defragmentation and data remapping operations for the data splits 0 to 3 of the target transaction group, which are randomly distributed over the memory blocks of the memory dies 610 to 670, to SLC memory blocks of the memory die 0 610.

At step 710, the controller 130 further performs a map data update operation according to a result of data defragmentation and data remapping operations to the target transaction group.

At step 715 after completion of step 710, the memory system 110 transmits to the host 102 a completion message indicating completion of data defragmentation and data remapping operations to the target transaction group.

At step 720, the memory system 110 receives a transaction group access message from the host 102. That is to say, the host 102 transmits a transaction group access message to the memory system 110 for access to the data of the target transaction group.

As described above, in the memory system in accordance with an embodiment, in the case where the rearrangement request message 800 including information on a target transaction group is received from the host 102, the data distribution of the target transaction group is identified through the information included in the header 810 and the data array 850 of the rearrangement request message 800. The data defragmentation and data remapping operations are performed for the target transaction group, whereby it is possible to improve data access efficiency of the transaction group.

FIGS. 9 to 17 are diagrams schematically illustrating application examples of the data processing system of FIG. 1.

Figure 9:
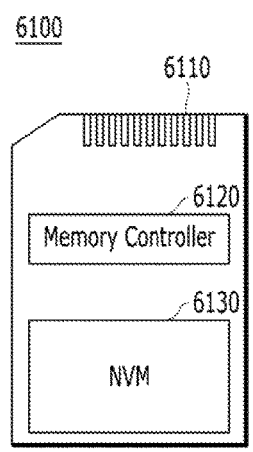
FIGS. 9 to 17 are diagrams schematically illustrating application examples of the data processing system shown in FIG. 1 in accordance with various embodiments of the present invention.

FIG. 9 is a diagram schematically illustrating another example of the data processing system including the memory system in accordance with the present embodiment. FIG. 9 schematically Illustrates a memory card system to which the memory system in accordance with the present embodiment is applied.

Referring to FIG. 9, the memory card system 6100 may Include a memory controller 6120, a memory device 6130 and a connector 6110.

More specifically, the memory controller 6120 may be connected to the memory device 6130 embodied by a nonvolatile memory, and configured to access the memory device 6130. For example, the memory controller 6120 may be configured to control read, write, erase and background operations of the memory device 6130. The memory controller 6120 may be configured to provide an interface between the memory device 6130 and a host, and drive firmware for controlling the memory device 6130. That is, the memory controller 6120 may correspond to the controller 130 of the memory system 110 described with reference to FIGS. 1 and 5, and the memory device 6130 may correspond to the memory device 150 of the memory system 110 described with reference to FIGS. 1 and 5.

Thus, the memory controller 6120 may include a RAM, a processing unit, a host interface, a memory interface and an error correction unit. The memory controller 130 may further include the elements shown in FIG. 5.

The memory controller 6120 may communicate with an external device, for example, the host 102 of FIG. 1 through the connector 6110. For example, as described with reference to FIG. 1, the memory controller 6120 may be configured to communicate with an external device through one or more of various communication protocols such as universal serial bus (USB), multimedia card (MMC), embedded MMC (eMMC), peripheral component interconnection (PCI), PCI express (PCIe), Advanced Technology Attachment (ATA), Serial-ATA, Parallel-ATA, small computer system interface (SCSI), enhanced small disk interface (EDSI), Integrated Drive Electronics (IDE), Firewire, universal flash storage (UFS), WIFI and Bluetooth. Thus, the memory system and the data processing system in accordance with the present embodiment may be applied to wired/wireless electronic devices or particularly mobile electronic devices.

The memory device 6130 may be implemented by a nonvolatile memory. For example, the memory device 6130 may be implemented by various nonvolatile memory devices such as an erasable and programmable ROM (EPROM), an electrically erasable and programmable ROM (EEPROM), a NAND flash memory, a NOR flash memory, a phase-change RAM (PRAM), a resistive RAM (ReRAM), a ferroelectric RAM (FRAM) and a spin torque transfer magnetic RAM (STT-RAM). The memory device 6130 may include a plurality of dies as in the memory device 150 of FIG. 5.

The memory controller 6120 and the memory device 6130 may be integrated into a single semiconductor device. For example, the memory controller 6120 and the memory device 6130 may construct a solid state driver (SSD) by being integrated into a single semiconductor device. Also, the memory controller 6120 and the memory device 6130 may construct a memory card such as a PC card (PCMCIA: Personal Computer Memory Card International Association), a compact flash (CF) card, a smart media card (e.g., SM and SMC), a memory stick, a multimedia card (e.g., MMC, RS-MMC, MMCmicro and eMMC), an SD card (e.g., SD, miniSD, microSD and SDHC) and a universal flash storage (UFS).

Figure 10:
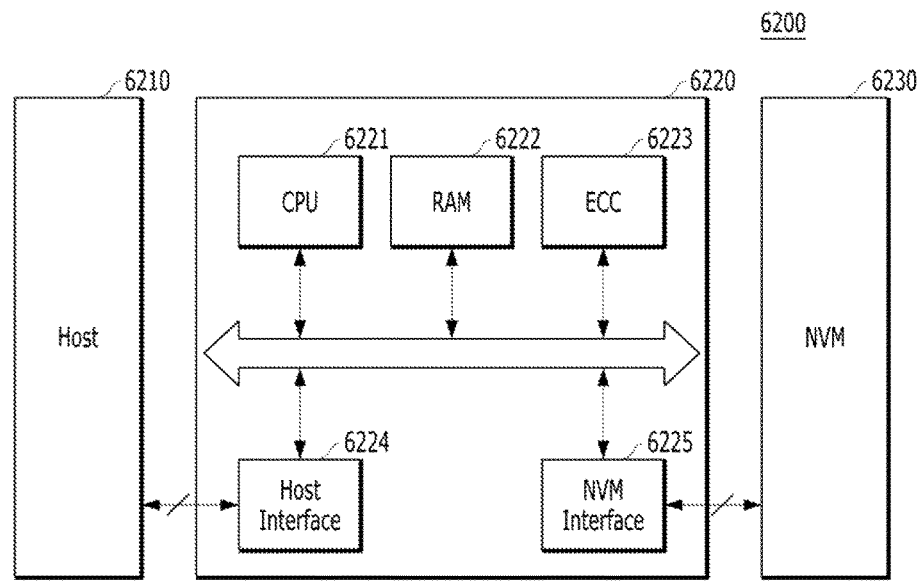

FIG. 10 is a diagram schematically illustrating another example of the data processing system including the memory system in accordance with an embodiment.

Referring to FIG. 10, the data processing system 6200 may include a memory device 6230 having one or more nonvolatile memories and a memory controller 6220 for controlling the memory device 6230. The data processing system 6200 illustrated in FIG. 10 may serve as a storage medium such as a memory card (CF, SD, micro-SD or the like) or USB device, as described with reference to FIG. 1. The memory device 6230 may correspond to the memory device 150 in the memory system 110 illustrated in FIGS. 1 and 5, and the memory controller 6220 may correspond to the controller 130 in the memory system 110 illustrated in FIGS. 1 and 5.

The memory controller 6220 may control a read, write or erase operation on the memory device 6230 in response to a request of the host 6210, and the memory controller 6220 may include one or more CPUs 6221, a buffer memory such as RAM 6222, an ECC circuit 6223, a host interface 6224 and a memory interface such as an NVM Interface 6225.

The CPU 6221 may control overall operations on the memory device 6230, for example, read, write, file system management and bad page management operations. The RAM 6222 may be operated according to control of the CPU 6221, and used as a work memory, buffer memory or cache memory. When the RAM 6222 is used as a work memory, data processed by the CPU 6221 may be temporarily stored in the RAM 6222. When the RAM 6222 is used as a buffer memory, the RAM 6222 may be used for buffering data transmitted to the memory device 6230 from the host 6210 or transmitted to the host 6210 from the memory device

6230. When the RAM 6222 is used as a cache memory, the RAM 6222 may assist the low-speed memory device 6230 to operate at high speed.

The ECC circuit 6223 may correspond to the ECC unit 138 of the controller 130 illustrated in FIG. 1. As described with reference to FIG. 1, the ECC circuit 6223 may generate an ECC (Error Correction Code) for correcting a fail bit or error bit of data provided from the memory device 6230. The ECC circuit 6223 may perform error correction encoding on data provided to the memory device 6230, thereby forming data with a parity bit. The parity bit may be stored in the memory device 6230. The ECC circuit 6223 may perform error correction decoding on data outputted from the memory device 6230. At this time, the ECC circuit 6223 may correct an error using the parity bit. For example, as described with reference to FIG. 1, the ECC circuit 6223 may correct an error using the LDPC code, BCH code, turbo code, Reed-Solomon code, convolution code, RSC or coded modulation such as TCM or BCM.

The memory controller 6220 may transmit/receive data to/from the host 6210 through the host interface 6224, and transmit/receive data to/from the memory device 6230 through the NVM interface 6225. The host Interface 6224 may be connected to the host 6210 through a PATA bus, SATA bus, SCSI, USB, PCIe or NAND interface. The memory controller 6220 may have a wireless communication function with a mobile communication protocol such as WiFi or Long Term Evolution (LTE). The memory controller 6220 may be connected to an external device, for example, the host 6210 or another external device, and then transmit/receive data to/from the external device. In particular, as the memory controller 6220 is configured to communicate with the external device through one or more of various communication protocols, the memory system and the data processing system in accordance with the present embodiment may be applied to wired/wireless electronic devices or particularly a mobile electronic device.

Figure 11:
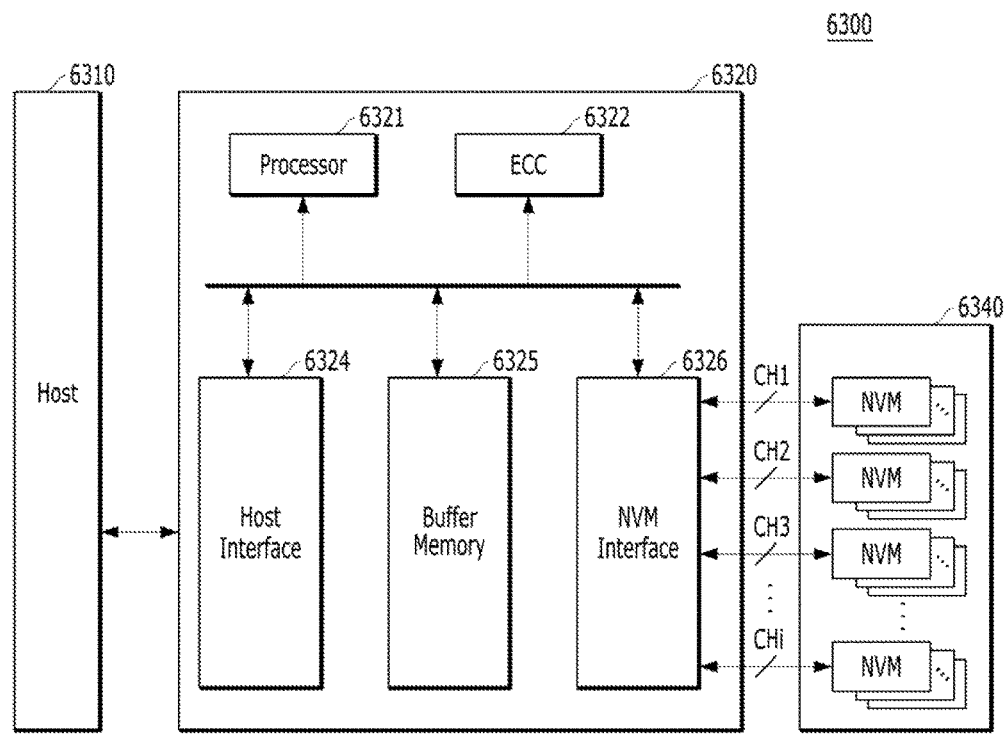

FIG. 11 is a diagram schematically illustrating another example of the data processing system including the memory system in accordance with an embodiment. Specifically, FIG. 11 schematically illustrates an SSD including a memory system in accordance with an embodiment.

Referring to FIG. 11, the SSD 6300 may include a controller 6320 and a memory device 6340 including a plurality of nonvolatile memories. The controller 6320 may correspond to the controller 130 in the memory system 110 of FIGS. 1 and 5, and the memory device 6340 may correspond to the memory device 150 in the memory system 110 of FIGS. 1 and 5.

More specifically, the controller 6320 may be connected to the memory device 6340 through a plurality of channels CH1 to CHi. The controller 6320 may include one or more processors 6321, a buffer memory 6325, an ECC circuit 6322, a host interface 6324 and a memory interface, for example, a nonvolatile memory interface 6326.

The buffer memory 6325 may temporarily store data provided from the host 6310 or data provided from a plurality of flash memories NVM included in the memory device 6340, or temporarily store meta data of the plurality of flash memories NVM, for example, map data including a mapping table. The buffer memory 6325 may be embodied by volatile memories such as DRAM, SDRAM, DDR SDRAM, LPDDR SDRAM and GRAM or nonvolatile memories such as FRAM, ReRAM, STT-MRAM and PRAM. For convenience of description, FIG. 10 illustrates that the buffer memory 6325 exists in the controller 6320. However, the buffer memory 6325 may exist outside the controller 6320.

The ECC circuit 6322 may calculate an ECC value of data to be programmed to the memory device 6340 during a program operation, perform an error correction operation on data read from the memory device 6340 based on the ECC value during a read operation, and perform an error correction operation on data recovered from the memory device 6340 during a failed data recovery operation.

The host interface 6324 may provide an interface function with an external device, for example, the host 6310, and the nonvolatile memory interface 6326 may provide an interface function with the memory device 6340 connected through the plurality of channels.

Furthermore, a plurality of SSDs 6300 to which the memory system 110 of FIGS. 1 and 5 is applied may be provided to embody a data processing system, for example, RAID (Redundant Array of Independent Disks) system. At this time, the RAID system may include the plurality of SSDs 6300 and a RAID controller for controlling the plurality of SSDs 6300. When the RAID controller performs a program operation in response to a write command provided from the host 6310, the RAID controller may select one or more memory systems or SSDs 6300 according to a plurality of RAID levels, that is, RAID level information of the write command provided from the host 6310 in the SSDs 6300, and output data corresponding to the write command to the selected SSDs 6300. Furthermore, when the RAID controller performs a read command in response to a read command provided from the host 6310, the RAID controller may select one or more memory systems or SSDs 6300 according to a plurality of RAID levels, that is, RAID level information of the read command provided from the host 6310 in the SSDs 6300, and provide data read from the selected SSDs 6300 to the host 6310.

Figure 12:
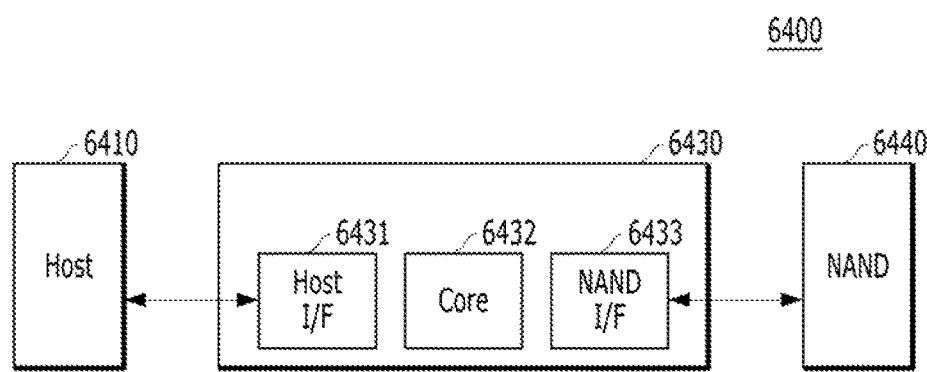

FIG. 12 is a diagram schematically illustrating another example of the data processing system including the memory system in accordance with an embodiment. Specifically, FIG. 12 schematically illustrates an embedded Multi-Media Card (eMMC).

Referring to FIG. 12, the eMMC 6400 may include a controller 6430 and a memory device 6440 embodied by one or more NAND flash memories. The controller 6430 may correspond to the controller 130 in the memory system 110 of FIGS. 1 and 5, and the memory device 6440 may correspond to the memory device 150 in the memory system 110 of FIGS. 1 and 5.

More specifically, the controller 6430 may be connected to the memory device 6440 through a plurality of channels. The controller 6430 may include one or more cores 6432, a host interface 6431 and a memory interface, for example, a NAND interface 6433.

The core 6432 may control overall operations of the eMMC 6400, the host interface 6431 may provide an interface function between the controller 6430 and the host 6410, and the NAND interface 6433 may provide an interface function between the memory device 6440 and the controller 6430. For example, the host Interface 6431 may serve as a parallel interface, for example, MMC interface as described with reference to FIG. 1. Furthermore, the host interface 6431 may serve as a serial interface, for example, UHS ((Ultra High Speed)-I/UHS-II) interface.

FIGS. 13 to 16 are diagrams schematically illustrating other examples of the data processing system including a memory system in accordance with an embodiment. Specifically, FIGS. 13 to 16 schematically illustrate UFS (Universal Flash Storage) systems.

Referring to FIGS. 13 to 16, the UFS systems 6500, 6600, 6700 and 6800 may include hosts 6510, 6610, 6710 and 6810, UFS devices 6520, 6620, 6720 and 6820 and UFS cards 6530, 6630, 6730 and 6830, respectively. The hosts 6510, 6610, 6710 and 6810 may serve as application processors of wired/wireless electronic devices or particularly mobile electronic devices, the UFS devices 6520, 6620, 6720 and 6820 may serve as embedded UFS devices, and the UFS cards 6530, 6630, 6730 and 6830 may serve as external embedded UFS devices or removable UFS cards.

The hosts 6510, 6610, 6710 and 6810, the UFS devices 6520, 6620, 6720 and 6820 and the UFS cards 6530, 6630, 6730 and 6830 in the respective UFS systems 6500, 6600, 6700 and 6800 may communicate with external devices, for example, wired/wireless electronic devices or particularly mobile electronic devices through UFS protocols, and the UFS devices 6520, 6620, 6720 and 6820 and the UFS cards 6530, 6630, 6730 and 6830 may be embodied by the memory system 110 illustrated in FIGS. 1 and 5. For example, in the UFS systems 6500, 6600, 6700 and 6800, the UFS devices 6520, 6620, 6720 and 6820 may be embodied in the form of the data processing system 6200, the SSD 6300 or the eMMC 6400 described with reference to FIGS. 10 to 12, and the UFS cards 6530, 6630, 6730 and 6830 may be embodied in the form of the memory card system 6100 described with reference to FIG. 9.

Furthermore, in the UFS systems 6500, 6600, 6700 and 6800, the hosts 6510, 6610, 6710 and 6810, the UFS devices 6520, 6620, 6720 and 6820 and the UFS cards 6530, 6630, 6730 and 6830 may communicate with each other through an UFS interface, for example, MIPI M-PHY and MIPI UniPro (Unified Protocol) in MIPI (Mobile Industry Processor Interface). Furthermore, the UFS devices 6520, 6620, 6720 and 6820 and the UFS cards 6530, 6630, 6730 and 6830 may communicate with each other through various protocols other than the UFS protocol, for example, UFDs, MMC, SD, mini-SD, and micro-SD.

Figure 13:
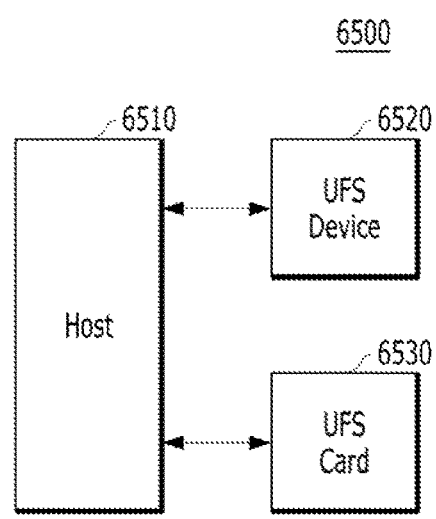

In the UFS system 6500 illustrated in FIG. 13, each of the host 6510, the UFS device 6520 and the UFS card 6530 may include UniPro. The host 6510 may perform a switching operation in order to communicate with the UFS device 6520 and the UFS card 6530. In particular, the host 6510 may communicate with the UFS device 6520 or the UFS card 6530 through link layer switching, for example, L3 switching at the UniPro. At this time, the UFS device 6520 and the UFS card 6530 may communicate with each other through link layer switching at the UniPro of the host 6510. In the present embodiment, the configuration in which one UFS device 6520 and one UFS card 6530 are connected to the host 6510 has been exemplified for convenience of description. However, a plurality of UFS devices and UFS cards may be connected in parallel or in the form of a star to the host 6410, and a plurality of UFS cards may be connected in parallel or in the form of a star to the UFS device 6520 or connected in series or in the form of a chain to the UFS device 6520.

Figure 14:
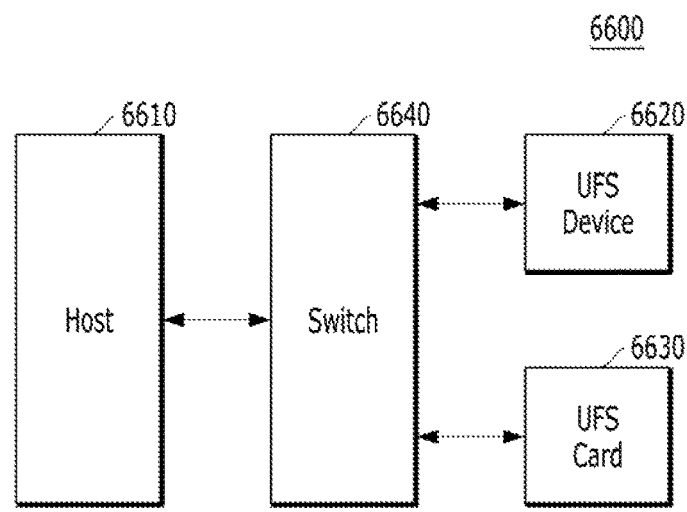

In the UFS system 6600 illustrated in FIG. 14, each of the host 6610, the UFS device 6620 and the UFS card 6630 may include UniPro, and the host 6610 may communicate with the UFS device 6620 or the UFS card 6630 through a switching module 6640 performing a switching operation, for example, through the switching module 6640 which performs link layer switching at the UniPro, for example, L3 switching. The UFS device 6620 and the UFS card 6630 may communicate with each other through link layer switching of the switching module 6640 at UniPro. In the present embodiment, the configuration in which one UFS device 6620 and one UFS card 6630 are connected to the switching module 6640 has been exemplified for convenience of description. However, a plurality of UFS devices and UFS cards may be connected in parallel or in the form of a star to the switching module 6640, and a plurality of UFS cards may be connected in series or in the form of a chain to the UFS device 6620.

Figure 15:
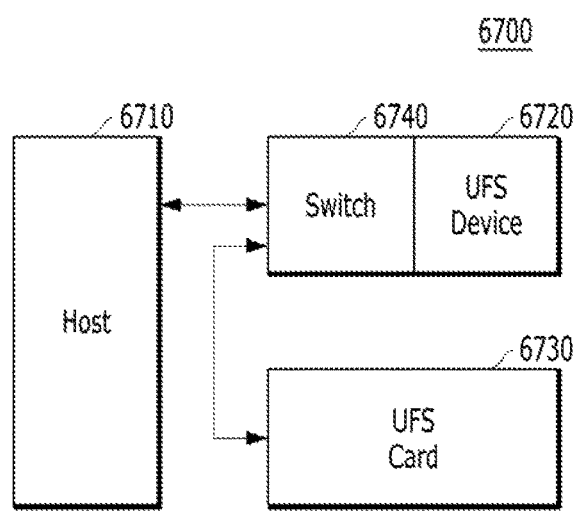

In the UFS system 6700 illustrated in FIG. 15, each of the host 6710, the UFS device 6720 and the UFS card 6730 may include UniPro, and the host 6710 may communicate with the UFS device 6720 or the UFS card 6730 through a switching module 6740 performing a switching operation, for example, through the switching module 6740 which performs link layer switching at the UniPro, for example, L3 switching. At this time, the UFS device 6720 and the UFS card 6730 may communicate with each other through link layer switching of the switching module 6740 at the UniPro, and the switching module 6740 may be integrated as one module with the UFS device 6720 inside or outside the UFS device 6720. In the present embodiment, the configuration in which one UFS device 6720 and one UFS card 6730 are connected to the switching module 6740 has been exemplified for convenience of description. However, a plurality of modules each including the switching module 6740 and the UFS device 6720 may be connected in parallel or in the form of a star to the host 6710 or connected in series or in the form of a chain to each other. Furthermore, a plurality of UFS cards may be connected in parallel or in the form of a star to the UFS device 6720.

Figure 16:
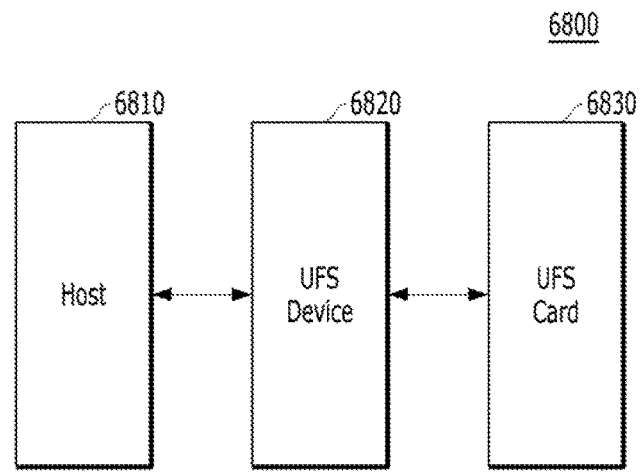

In the UFS system 6800 illustrated in FIG. 16, each of the host 6810, the UFS device 6820 and the UFS card 6830 may include M-PHY and UniPro. The UFS device 6820 may perform a switching operation in order to communicate with the host 6810 and the UFS card 6830. In particular, the UFS device 6820 may communicate with the host 6810 or the UFS card 6830 through a switching operation between the M-PHY and UniPro module for communication with the host 6810 and the M-PHY and UniPro module for communication with the UFS card 6830, for example, through a target ID (Identifier) switching operation. At this time, the host 6810 and the UFS card 6830 may communicate with each other through target ID switching between the M-PHY and UniPro modules of the UFS device 6820. In the present embodiment, the configuration in which one UFS device 6820 is connected to the host 6810 and one UFS card 6830 is connected to the UFS device 6820 has been exemplified for convenience of description. However, a plurality of UFS devices may be connected in parallel or in the form of a star to the host 6810, or connected in series or in the form of a chain to the host 6810, and a plurality of UFS cards may be connected in parallel or in the form of a star to the UFS device 6820, or connected in series or in the form of a chain to the UFS device 6820.

Figure 17:
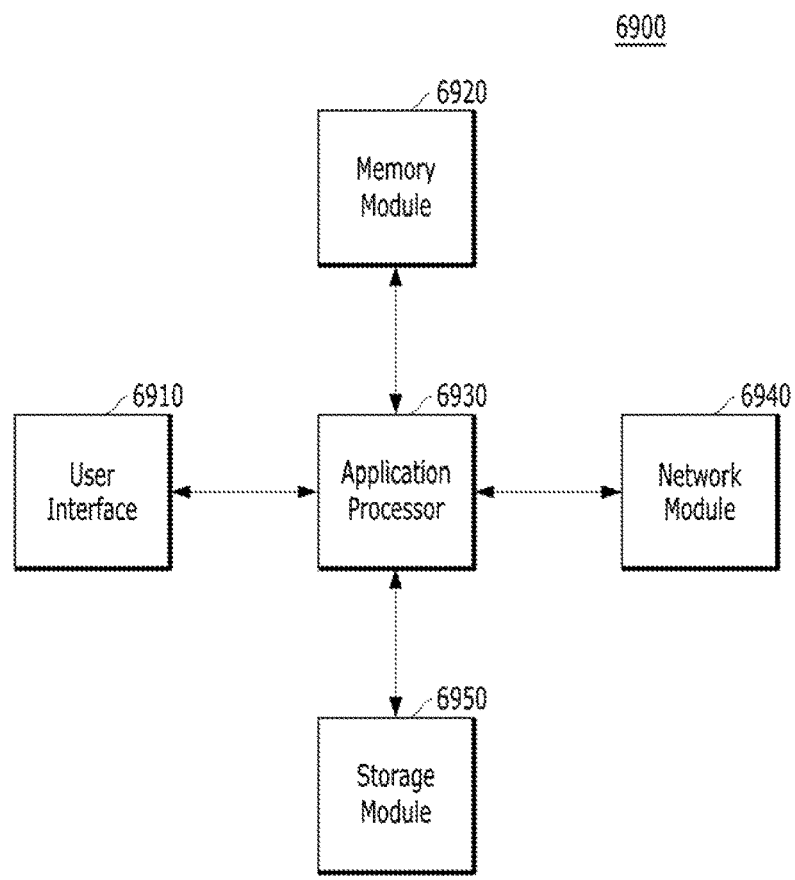

FIG. 17 is a diagram schematically illustrating another example of the data processing system including a memory system in accordance with an embodiment. Specifically, FIG. 17 schematically illustrates a user system.

Referring to FIG. 17, the user system 6900 may include an application processor 6930, a memory module 6920, a network module 6940, a storage module 6950 and a user interface 6910.

More specifically, the application processor 6930 may drive components included in the user system 6900, for example, an OS, and include controllers, interfaces and a graphic engine which control the components included in the user system 6900. The application processor 6930 may be provided as System-on-Chip (SoC).

The memory module 6920 may be used as a main memory, work memory, buffer memory or cache memory of the user system 6900. The memory module 6920 may include a volatile RAM such as DRAM, SDRAM, DDR SDRAM, DDR2 SDRAM, DDR3 SDRAM, LPDDR SDARM, LPDDR3 SDRAM or LPDDR3 SDRAM or a nonvolatile RAM such as PRAM, ReRAM, MRAM or FRAM. For example, the application processor 6930 and the memory module 6920 may be packaged and mounted, based on POP (Package on Package).

The network module 6940 may communicate with external devices. For example, the network module 6940 may not only support wired communication, but also support various wireless communication protocols such as code division multiple access (CDMA), global system for mobile communication (GSM), wideband CDMA (WCDMA), CDMA-2000, time division multiple access (TDMA), long term evolution (LTE), worldwide interoperability for microwave access (Wimax), wireless local area network (WLAN), ultra-wideband (UWB), Bluetooth, wireless display (WI-DI), thereby communicating with wired/wireless electronic devices or particularly mobile electronic devices. Therefore, the memory system and the data processing system, in accordance with an embodiment of the present invention, can be applied to wired/wireless electronic devices. The network module 6940 may be included in the application processor 6930.

The storage module 6950 may store data, for example, data received from the application processor 6930, and then may transmit the stored data to the application processor 6930. The storage module 6950 may be embodied by a nonvolatile semiconductor memory device such as a phase-change RAM (PRAM), a magnetic RAM (MRAM), a resistive RAM (ReRAM), a NAND flash, NOR flash and 3D NAND flash, and provided as a removable storage medium such as a memory card or external drive of the user system 6900. The storage module 6950 may correspond to the memory system 110 described with reference to FIGS. 1 and 5. Furthermore, the storage module 6950 may be embodied as an SSD, eMMC and UFS as described above with reference to FIGS. 11 to 16.

The user interface 6910 may include interfaces for inputting data or commands to the application processor 6930 or outputting data to an external device. For example, the user interface 6910 may include user input interfaces such as a keyboard, a keypad, a button, a touch panel, a touch screen, a touch pad, a touch ball, a camera, a microphone, a gyroscope sensor, a vibration sensor and a piezoelectric element, and user output interfaces such as a liquid crystal display (LCD), an organic light emitting diode (OLED) display device, an active matrix OLED (AMOLED) display device, an LED, a speaker and a motor.

Furthermore, when the memory system 110 of FIGS. 1 and 5 is applied to a mobile electronic device of the user system 6900, the application processor 6930 may control overall operations of the mobile electronic device, and the network module 6940 may serve as a communication module for controlling wired/wireless communication with an external device. The user interface 6910 may display data processed by the processor 6930 on a display/touch module of the mobile electronic device, or support a function of receiving data from the touch panel.

The memory system and the operating method thereof according to various embodiments of the present invention may reduce complexity and performance deterioration of the memory system and may also increase the use efficiency of a memory device employed by the memory system to thereby quickly and stably process data with respect to the memory device.

Although various embodiments have been described for illustrative purposes, it will be apparent to those skilled in the art that various changes and modifications may be made without departing from the spirit and scope of the invention as defined in the following claims.

What is claimed is:

1. A memory system comprising:
a memory device including a plurality of memory dies each having a plurality of memory blocks; and a controller suitable for performing one or more of data defragmentation and data remapping operations for a target transaction group in the memory device in response to a request message provided from a host, transmitting a completion message to the host as a response to the request message, and receiving an access to the transaction group, from the host, wherein the request message includes a data array having information on data splits of the target transaction group, and address lists of the target transaction group, wherein the request message further includes a header having a flag indicating type information of the data defragmentation and data remapping operations, wherein the type information indicates at last one among a general mode, a fast mode, an optimized mode, a cold mode and a hot mode.

2. The memory system according to claim 1, wherein the header further has a total size of the target transaction group.

3. The memory system according to claim 1, wherein the header further has a split count of the target transaction group.

4. The memory system according to claim 1, wherein the information on data splits of the target transaction group of the data array has start addresses and address sizes for respective data splits of the target transaction group.

5. The memory system according to claim 1, wherein the controller identifies a data distribution of the target transaction group in the memory device through the header, the data array and the address lists of the target transaction group.

6. The memory system according to claim 5, wherein the controller performs the one or more of data defragmentation and data remapping operations for the data splits of the target transaction group with memory blocks of memory dies coupled to the same channel or memory blocks of the same cell type.

7. The memory system according to claim 5, wherein the controller performs only a data remapping operation for metadata of the data splits of the target transaction group.

8. A method for operating a memory system, comprising:
receiving, from a host, a request message with respect to a memory device including a plurality of memory dies each having a plurality of memory blocks; and performing one or more of data defragmentation and data remapping operations for a target transaction group in the memory device in response to the request message, wherein the request message includes a data array having information on data splits of the target transaction group, and address lists of the target transaction group, wherein the request message further includes a header having a flag indicating type information of the data defragmentation and data remapping operations, wherein the type information indicates at last one among a general mode, a fast mode, an optimized mode, a cold mode and a hot mode.

9. The method according to claim 8, wherein the header further has a total size of the target transaction group.

10. The method according to claim 8, wherein the header further has a split count of the target transaction group.

11. The method according to claim 8, wherein the information on data splits of the target transaction group of the data array has start addresses and address sizes for respective data splits of the target transaction group.

12. The method according to claim 8, wherein the performing includes identifying a data distribution of the target transaction group in the memory device through the header, the data array and the address lists of the target transaction group.

13. The method according to claim 10, wherein the one or more of data defragmentation and data remapping operations are performed for the data splits of the target transaction group with memory blocks of memory dies coupled to the same channel or memory blocks of the same cell type.

14. The method according to claim 10, wherein only the data remapping operation is performed for metadata of the data splits of the target transaction group.

* * * * *